United States Patent
Zamzow et al.

(12)

(10) Patent No.: US 6,258,895 B1
(45) Date of Patent: Jul. 10, 2001

(54) POLYMERS HAVING SPIRO ORTHOESTER GROUPS, PROCESS OF MANUFACTURING AND USING

(75) Inventors: Manfred Zamzow; Hartwig Hocker, both of Aachen (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 08/619,420

(22) Filed: Mar. 21, 1996

Related U.S. Application Data

(63) Continuation of application No. 08/356,360, filed on Dec. 21, 1994, now abandoned.

(30) Foreign Application Priority Data

Jun. 26, 1992 (BE) .................................................. 92201905

(51) Int. Cl.$^7$ .................................................. C08C 19/22
(52) U.S. Cl. .................................................. 525/382
(58) Field of Search .............................................. 525/382

(56) References Cited

FOREIGN PATENT DOCUMENTS 0A 275 062 * 6/1989 (EP) .
0A 279 251 * 6/1989 (EP) .

OTHER PUBLICATIONS

Makromol. Chem., vol. 191 "Synthese and Polymensation Sverhalten never spirocyclisher Methacrylate" (1990), (Haase et al.) pp. 549–556.*

\* cited by examiner

Primary Examiner—Terressa M. Boykin
(74) Attorney, Agent, or Firm—Betty J. Zea; Karen F. Clark; Dinsmore & Shohl

(57) ABSTRACT

Process for the manufacture of polymers having repeating units comprising spiro orthoester groups of general formula (I), wherein A is $C_{1-6}$-alkylene, $C_{1-6}$-alkyleneoxycarbonyl or an oxygen-carbon bond, $R^1$ is hydrogen or methyl, $R^2$ is $C_{1-6}$-alkyl or $C_{1-6}$-alkyl substituted by $C_{1-6}$-alkoxy or aryloxy, $R^3$ and $R^4$ independently are hydrogen or $C_{1-6}$-alkyl, $R^5$ is hydrogen or methyl, $R^6$ is hydrogen, methyl, phenyl, carboxy, carboxy-$C_{1-6}$-alkyl, carboxamido or cyano, n is an integer >1 and m is 0 or an integer $\geq 1$, with the proviso that the molecular weight of the polymer is between 500 and 1,000,000, the polymers obtained and their use specifically in dental filling materials.

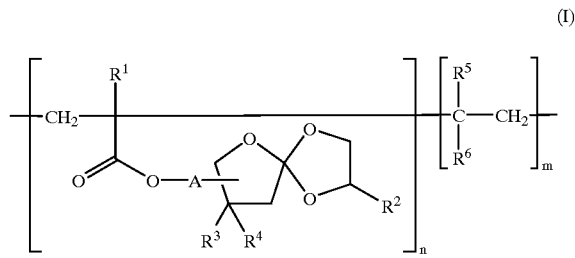

16 Claims, No Drawings

POLYMERS HAVING SPIRO ORTHOESTER GROUPS, PROCESS OF MANUFACTURING AND USING

This is a continuation of application Ser. No. 08/356,360, filed Dec. 21, 1994 now abandoned.

DESCRIPTION

The subject matter of the present application is a process for the manufacture of polymers having repeating units comprising spiro orthoester groups, the polymers obtained thereby and their use for the manufacture of strain free composites, high strength adhesives, additives to other monomer mixtures to control the amount of shrinkage or expansion upon polymerization and specifically in dental filling materials.

U.S. Pat. No. 4,387,215 already discloses that polymers formed by the polymerization of polycyclic ring-opening monomers, such as monomers comprising spiro orthoester groups, spiro orthocarbonate groups and polycyclic ketal lactone groups show near zero shrinkage or expansion during polymerization and are therefore usable for the manufacture of strain-free composites, high strength adhesive, precision castings and specifically binders for propellants.

The subject matter of DE-A-24 8 597 is a method for the manufacture of homopolymers comprising spiro orthoester groups of the following formula

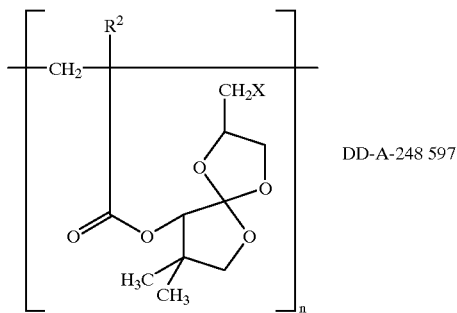

DD-A-248 597 wherein $R^2$ is hydrogen or methyl and X is halogen.

Said homopolymers are stated to be useful as adhesives, casting resins, protection coatings and for dental materials. The homopolymers are manufactured by the radical polymerization of 2-halomethyl-8,8-dimethyl-9-(meth)acryloyloxy- 1,4,6-trioxaspiro[4.4]nonanes. However, this process is not fully satisfying with respect both to the manufacture of the starting materials and their polymerization.

The object of the present invention therefore is the provision of an improved process for the manufacture of polymers having repeating units comprising spiro orthoester groups which provides the products from easily available starting products with high purity and high yields, novel polymers obtained thereby and their use.

The subject matter of the present application therefore is the process according to claim 1. The subclaims comprise preferred embodiments of this process, novel polymers obtainable by this process and the use of these polymers.

The subject matter of the present invention therefore is a process for the manufacture of polymers having repeating units comprising spiro orthoester groups of the following general formula I.

wherein

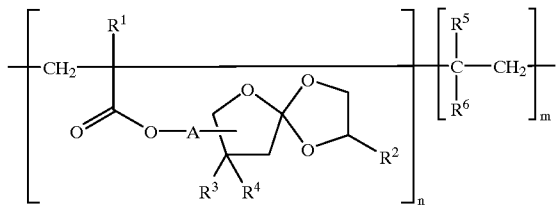

(I)

A is $C_{1-6}$-alkylene, $C_{1-6}$-alkyleneoxycarbonyl or an oxygen-carbon bond, $R^1$ is hydrogen or methyl, $R^2$ is $C_{1-6}$-alkyl or $C_{1-6}$-alkyl substituted by $C_{1-6}$-alkoxy or aryloxy, $R^3$ and $R^4$ independently are hydrogen or $C_{1-6}$-alkyl, $R^5$ is hydrogen or methyl, $R^6$ is hydrogen, methyl, phenyl, carboxy, carboxy-$C_{1-6}$-alkyl, carboxamido or cyano, n is an integer >1 and m is 0 or an integer ≧1, with the proviso that the molecular weight of the polymer is between 500 and 1,000,000, which is characterized by reacting a polymer having repeating units comprising lactone groups of the following general formula II

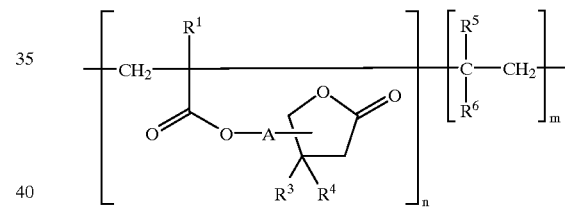

(II)

wherein A, $R^1$, $R^3$, $R^4$, $R^5$, $R^6$, n and m are as defined above, with an oxirane compound of the following general formula III

(III)

wherein $R^2$ is as defined above.

According to a preferred embodiment A is a methylene group, an ethylene oxycarbonyl group or an oxygen-carbon bond. $R^1$ preferably is methyl, $R^2$ preferably is $C_{1-6}$-alkyl substituted by phenoxy and more preferably phenoxymethyl. $R^3$ and $R^4$ preferably are hydrogen or methyl. $R^5$ preferably is hydrogen or methyl. Preferably m is 0 and n is an integer such that the molecular weight of the polymer is between 500 and 500,000. more preferably between 1,000 and 50,000 and most preferably between 25,000 and 45,000.

According to a preferred embodiment of the process of the present invention the reaction is carried out in an organic solvent, such as benzene, dichloromethane, trichloroethylene, dichloroethylene, carbontetrachloride, chlorobenzene, nitrobenzene and cyclohexane, more preferably in anyone of the halogenated organic solvents inert to the reaction and most preferably in dichloromethane. The reaction of the starting material of formula (II) with the oxirane compound of the general formula (III) is preferably carried out in the presence of a catalyst or more preferably in the presence of a Lewis acid catalyst, such as boron trifluoride, boron trifluoride etherate, aluminum trichloride, tin dichloride, tin tetrachloride, titanium tetrachloride and iron trichloride. The reaction can be carried out at room temperature at a reaction time of 1 to 5 hours, preferably 2 to 4 hours.

According to a further preferred embodiment of the present invention, the starting compound of general formula (II) is manufactured by radical polymerization of a 2-oxo-tetrahydrofurane derivative of the following general formula (IV)

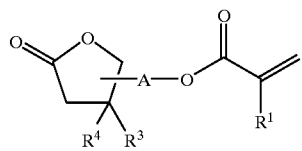

(IV)

wherein A, $R^1$, $R^3$ and $R^4$ are as defined above. For the manufacture of a copolymer of the above formula (I), wherein m is an integer of $\geq 1$, the polymerization is carried out in the presence of a copolymerizable monomer of the following general formula (V)

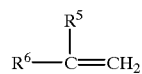

(V)

wherein $R^5$ and $R^6$ are as defined above. Specifically preferred copolymerizable monomers of formula (V) are ethylene, propylene, (meth)acrylic acid and the esters thereof, acrylonitrile, acrylamide, styrene and the like.

The polymerization yielding the starting compounds of formula (II) is preferably carried out in solution in an inert organic solvent and in the presence of a radical forming catalyst. As the organic solvent preferably an aromatic solvent, such as toluene is used. As the catalyst a free radical forming catalyst useful for such polymerizations can be used, such as a peroxide catalyst or more preferably azobisisobutyronitrile.

The subject matter of the present application further are polymers having repeating units comprising spiro orthoester groups of the following general formula (I)

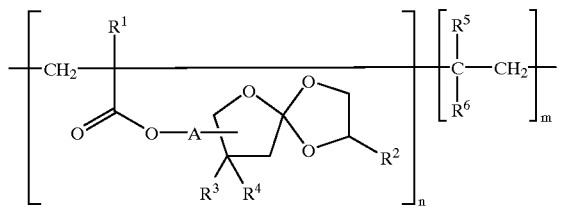

(I)

wherein A, $R^1$, $R^2$, $R^3$, $R^4$, $R^5$, $R^6$, m and n are as defined above. Specifically preferred polymers are homopolymers having repeating units comprising spiro orthoester groups of the following general formula VI

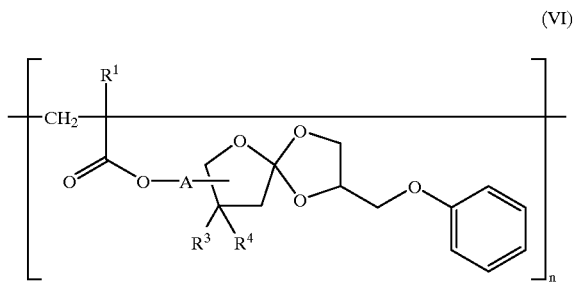

(VI)

wherein

A is $C_{1-6}$-alkylene. $C_{1-6}$-alkyleneoxycarbonyl or an oxygen-carbon bond, $R^1$ is hydrogen or methyl.

$R^3$ and $R^4$ independently are hydrogen or $C_{1-6}$-alkyl, n is an Integer $\geq 1$ with the proviso that the molecular weight of the polymer is between 3,000 and 50,000.

The process of the present invention is specifically advantageous, in that the polymers having useful properties are easy to synthesize from readily available starting material and provides the products with high yield and high purity. The 2-oxo-tetrahydrofurane derivatives of the following general formula (IV)

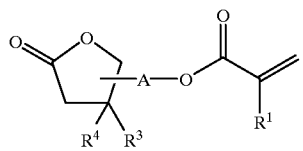

(IV)

wherein A, $R^1$, $R^3$ and $R^4$ are as defined above, can be manufactured with ease by reacting the corresponding lactone of formula (VI)

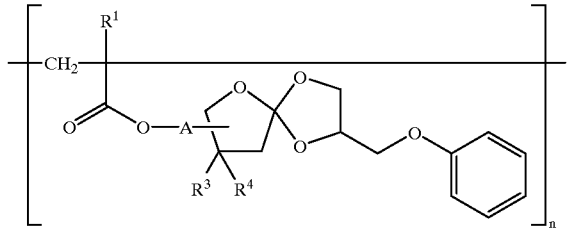

(VI)

with (meth)acryloyl chloride.

Specifically preferred polymers corresponding to the above general formula (I) are the following:

Homopolymers having repeating units comprising spiro orthoester groups of the following general formula VI

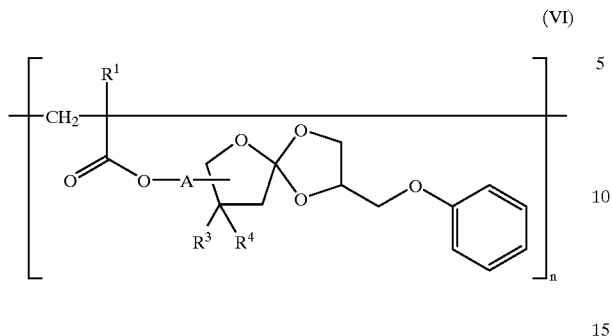

(VI)

wherein

A is $C_{1-6}$-alkylene. $C_{1-6}$-alkyleneoxycarbonyl or an oxygen-carbon bond, $R^1$ is hydrogen or methyl, $R^3$ and $R^4$ independently are hydrogen or $C_{1-6}$-alkyl, n is an integer >1 with the proviso that the molecular weight of the polymer is between 3,000 and 50,000.

poly-{1-methyl-1-[2-(phenoxymethyl)-1,4,6-trioxaspiro[4.4]nonane-7-yl]methoxycarbonyl]ethylenes} having the formula 4

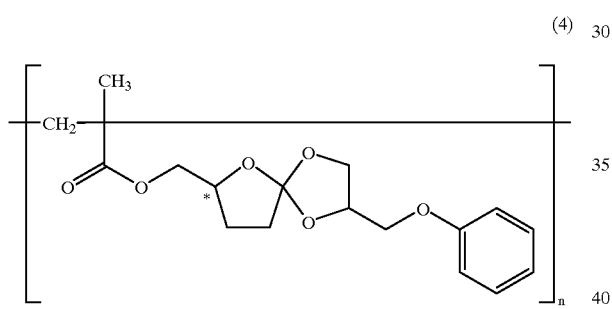

(4)

and a molecular weight in the range of 5,000 to 500,000, preferably 20,000 to 40,000.

poly-{1-methyl-1-[2-(phenoxymethyl)-1,4,6-trioxaspiro[4.4]nonane-7-yl]carbonyloxy-ethoxycarbonyl]ethylenes} having the formula 8

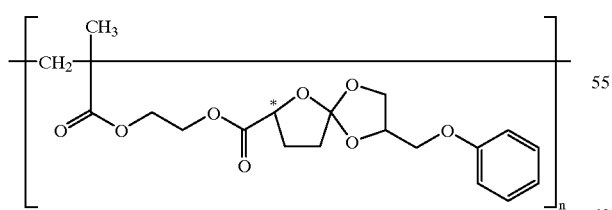

(8)

and a molecular weight in the range of 5,000 to 50,000, and poly-{1-methyl-1-[2-(phenoxymethyl)-8,8-dimethyl-1,4,6-trioxaspiro[4.4]nonane-9-yl]oxycarbonyl]ethylenes} having the formula 12

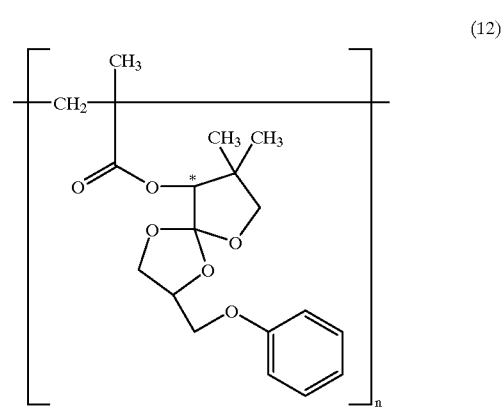

(12)

and a molecular weight in the range of 5,000 to 500,000, preferably 20,000 to 40,000.

The above homopolymers preferably have a molecular weight in the range of 5,000 to 50,000, more preferably between 10,000 and 40,000 and even more preferred between 25,000 and 35,000.

The polymers of the present invention comprise pending spiro orthoester groups, which can be subjected to ring opening polymerization. As is known from U.S. Pat. No. 4,387,215, this ring-opening polymerization has the effect that the polymer does in contrast to normal polymerization not show shrinkage but no shrinkage or even slight expansion caused by the ring opening, as can be demonstrated by the following scheme, showing that in dependency from the attack of the electrophilic agent at the 0–1 atom or 0–4 atom two different polymer structures are obtained:

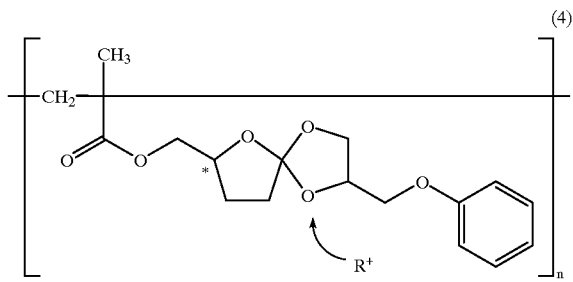

(4)

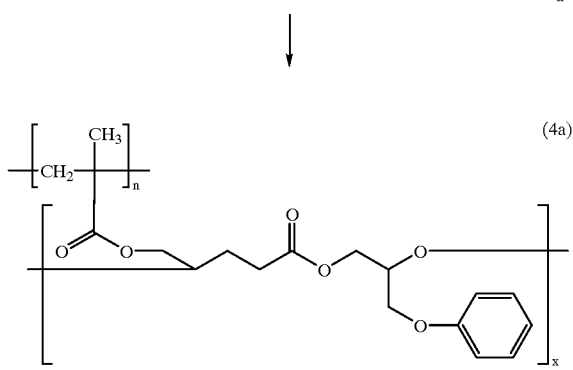

(4a)

-continued

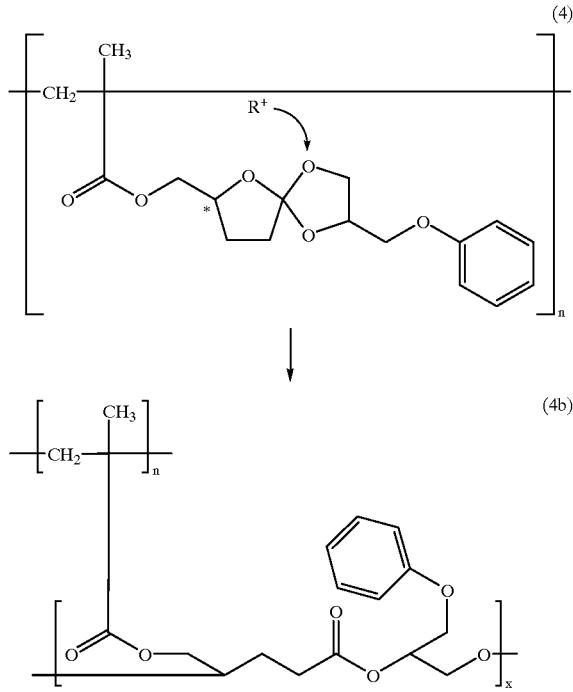

Therefore, the polymers of the present invention are highly advantageous, in that they can be used to provide strain free hardenable compositions providing hardened products, which have a controlled amount of shrinkage or expansion, an effect very desirable for example in dental filling compositions, which should most closely fit to the tooth to be restored.

The properties of the polymers of the present invention can be controlled as desired by the proper selection of the pending spiro orthoester groups and the fact as to whether copolymerizable monomers are present and what kind of copolymerizable monomers they are. On the basis of these copolymerizable monomers further properties of the corresponding copolymers can be provided.

The preferred homopolymers of the present invention can be used as such or blended with other polymers, fillers, reinforcing fibers and additives usual for the manufacture of composites and casting resins and specifically dental filling compositions. Therefore, the present invention provides for the possibility of tailoring the polymers according to the desired properties of the final hardened product.

A further subject matter of the present invention therefore is the use of the above polymers which are capable of expanding upon reaction of the spiro orthoester groups for the manufacture of strain free composites, high strength adhesives, as additives to other monomer mixtures to control the amount of shrinkage or expansion upon polymerization and specifically for the manufacture of dental filling materials. For this type of utility, the polymers of the present invention are mixed with usual fillers, pigments, hardeners and usual additives.

During their use the polymers of the present invention are subjected to a ring opening polymerization providing the expansion of the polymer. This polymerization is preferably initiated by catalysts which generate cations during radiation. As such catalysts diaryliodonium salts, organometallic salts, such as ($\beta^5$-2,4-cyclopentadiene-1-yl)[(1,2,3,4,5,6-$\beta$)-(1-methylethyl)-benzene]-iron(I)hexyfluorophosphate and triarylsulfonium salts may be used. These catalysts are mixed with polymers and additional components, such as pigments, fillers and etc., brought to the desired shape, such as the filling of a cavity in a tooth, and are then subjected to the ring opening polymerization by irradiation with actinic light, such as ultraviolet light.

The present invention can be explained more in detail by making reference to the following examples.

EXAMPLE 1

Poly-{1 -methyl-1-[2-(phenoxymethyl)-1,4,6-trioxaspiro [4.4]nonane-7-yl]methoxycarbonyl]ethylene} a) synthesis of 5-(methacryloyloxymethyl)-2-oxo-tetrahydrofurane (2)

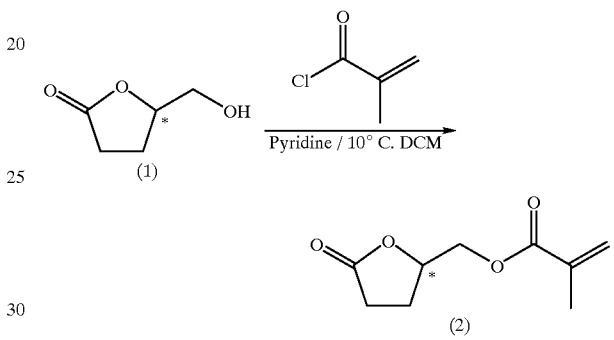

5-Hydroxymethyl-2-oxo-tetrahydrofurane (1) was obtained according to the method of R. M. Silverstein (Tetrahedron, 34. (1978) 1449). To the alcohol (10.1 g, 87 mmol) were added 100 ml dichloromethane and 8.4 ml (104 mmol) pyridine; the mixture was cooled to −10° C. Then a solution of 40 ml dichloromethane and 8.3 ml (87 mmol) methacryloyl chloride were added dropwise during a period of 1.5 h. The solution was stirred overnight at room temperature. The solvent was evaporated and the residue was chromatographed on silica gel (ethylacetate/hexane (2:1)).

Yield: 13.4 g =83.5 %

IR-spectrum: ($\nu$ cm$^{-1}$, KBr) 2959 (CH$_3$); 2934 (CH$_2$); 1779 (C=O, lactone); 1720 (C=O); 1637 (C=C); 1153 (C—O); 1074 (C—O—C); 886 (=CH$_2$).

$^1$H-NMR-spectrum: ($\delta$ in ppm, 200 MHz, CDCl$_3$) 6.14 (m, 1H,=CH$_2$ cis); 5.63 (m, 1H=CH$_2$ trans), 4.8 (m, 1H, CH); 4.32 (d/d, 2H, CH$_2$O); 2.61 (m, 2H, CH$_2$); 2.39 (m, 2H, CH$_2$); 1.95 (t, 3H, CH$_3$).

$^{13}$C-NMR-spectrum: ($\delta$ in ppm, 50.3 MHz, CDCl$_3$) 176.4 (C=O, lactone); 166.7 (C=O); 135.5 (C—CH$_3$); 126.3 (=CH$_2$); 77.2 (CH$_2$—O); 65.4 (O—CH—CH$_2$); 28.0 (C$^{67}$); 23.8 (C$\beta$); 16.1 (CH$_3$).

b) Radical polymerization of 5-(methacryloyloxymethyl)-2-oxo-tetrahydrofurane (2)

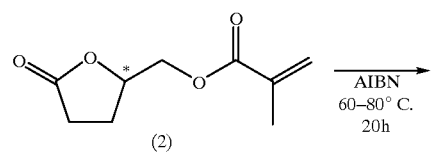

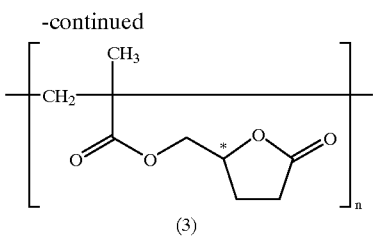

To a solution of 1.8 g (9.7 mmol) 5-(methacryloyloxymethyl)-2-oxo-tetrahydrofurane (2) were added 40 ml toluene and 15.9 mg (1 mol %) azobisisobutyronitrile (AIBN). The mixture was heated to 70° C. on an oil bath for 20 h and then the solvent was evaporated. The oily product was dissolved in 5 ml dichloromethane and precipitated in hexane. The colorless polymer was filtered and dried in vacuo.

Yield: 1.66 g=92%.

IR-spectrum: ($\nu$ In cm$^{-1}$, KBr) 2955 (CH$_3$); 1778 (C=O, lactone); 1731 (C=O); 1156 (C—O); 1071 (C—O—C).

$^1$H-NMR-spectrum: ($\delta$ in ppm, 200 MHz, DMSO-d$_6$, T=100° C.) 4.9-4.65 (m, 1H, CH); 4.3-3.9 (m, 2H, CH$_2$O); 2.64-2.23 (m, 4H, CH$_2$); 2.18-1.68 (m, 2H, CH$_2$—CCH$_3$); 1.18-0.75 (s, 3H, CH$_3$).

$^{13}$C-NMR-spectrum: ($\delta$ in ppm, 50.3 MHz, DMSO-d$_6$, T=100° C.) 175.8 (C=O, lactone): 175.2 (C=O); 76.2 (CH$_2$-O); 65.6 (C$^{65}$); 44.1 (C—CH$_3$); 27.1 (C$^\alpha$); 22.9 (C$^\beta$); 16.1, 16.7 (CH$_2$—C—CH$_3$).

c) Synthesis of polyl{1-methyl- 1[2-(phenoxymethyl)-1,4,6-trioxaspiro [14.4]nonane-7-yl]methyloxycarbonyl}ethylene (4) via polymer analogous reaction

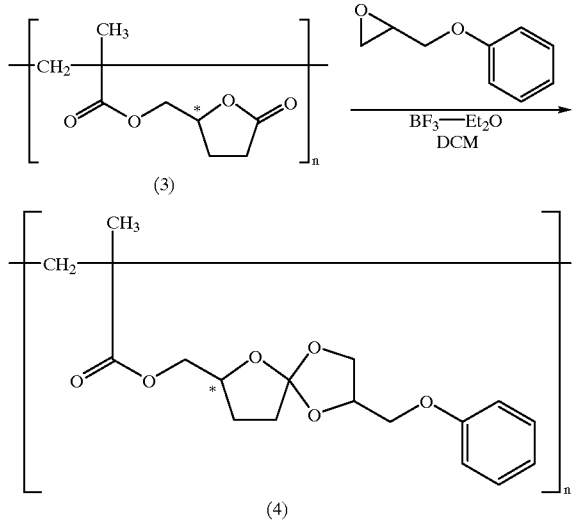

To a solution of 1.4 g (7.4 mmol) polyl{-methyl-1[(2-oxo-tetrahydrofurane-5-yl)methyloxycarbonyl]}ethylene (3) were added 80 ml dichloromethane, 4 ml (30 mmol) 2,3-epoxypropylphenylether and 0.15 ml borontrifluoride etherate. The mixture was stirred at room temperature for 4 h, and the catalyst hydrolized with 5 ml aqueous sodium hydroxide, the organic layer was separated, dried and concentrated and the polymer precipitated by pouring the solution in ethanol.

IR-spectrum: ($\nu$ in cm$^{-1}$, KBr) 3032 (CH, arom.); 2944 (CH$_3$); 1779 (C=O, lactone); 1732 (C=O); 1599 (C—C, arom.); 1152 (C—O—C): 756 (CH, arom.). 692 (CH, arom.).

$^1$H-NMR-spectrum: ($\delta$ in ppm, 200 MHz, CDCl$_3$) 7.36-7.08 (m, 2H, H arom.); 7.00-6.71 (m, 3H, H arom.); 4.86-4.45 (m, 1H) 4.27-4.09 (m, 2H, CH$_2$—O—C=O); 4.09-3.09 (m, 5H, CH, CH$_2$); 2.64-1.64 (m, 4H, CH$_2$); 1.45-1.16 (m, 2H, CH$_2$—CCH$_3$), 1.16-0.68 (m, 3H, CH$_3$).

EXAMPLE 2

Poly-{1-methyl-1-[2-(phenoxymethyl)-1,4,6-trioxaspiro [4.4]nonane-7-yl]carbonyloxy-ethoxycarbonyl]ethylene} a) Synthesis of 5-{[2-(methacryloyloxy) ethyloxy] carbonyl}-2-oxo-tetrahydrofurane

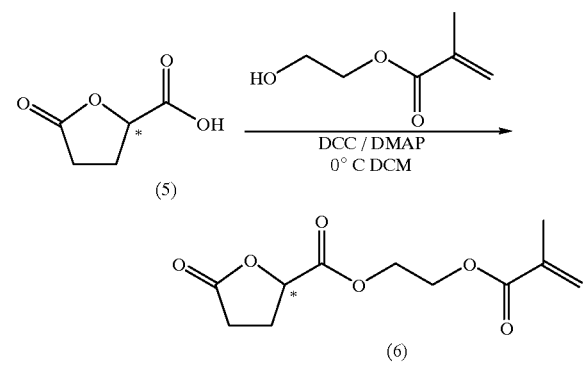

The starting carboxylic acid (5) was synthesized according to the method of C. Herdeis (Synthesis, 232 (1986)). 6.5 g (50 mmol) of the carboxylic acid (5) were dissolved in 300 ml dichloromethane and cooled to −10° C. To the solution were added 11.4 g (55 mmol) dicyclohexylcarbodiimide, 6.7 ml (55 mmol) hydromethylmethacrylate and 0.61 g (5 mmol) N,N'-dimethylamino pyridine (DMAP). The mixture was stirred overnight, the dicyclohexylurea filtered off and the resulting filtrate extracted with water (3 times), acetic acid and again with water. The organic layer was dried with Na$_2$SO$_4$ and the solvent evaporated. The solid was chromatographed on silica gel (dichloromethane/ethylacetate (9:1).

Yield: 10.8 g=89.2%

IR-spectrum: ($\nu$ in cm$^{-1}$, KBr) 2968 (CH$_3$); 1789 (C=O, lactone); 1748 (C=O); 1631 (C=C); 1154 (C—O); 1064 (C—O—C).

$^1$H-NMR-spectrum: ($\delta$ in ppm, 90 MHz, CDCl$_3$) 6.15 (s, 1H,=CH$_2$); 5.6 (m, 1H,=CH$_2$); 4.95 (m, 1H, CH—O): 4.4 (s, 4H, CH$_2$—O); 2.6 (m, 4H, CH$_2$); 1.95 (s, 3H, CH$_3$).

$^{13}$C-NMR-spectrum: ($\delta$ in ppm, 50.3 MHz, CDCl$_3$) 175.8 (C=O, lactone); 169.6 (C=O); 165.6 (C=O); 131.5 (CH=CH$_2$); 127.6 (=CH$_2$); 75.4 (CH); 63.3 (CH$_2$—O); 61.6 (CH$_2$—O); 26.5 (CH$_2$); 25.6 (CH$_2$); 16.1 (CH$_3$).

b) Polymerization of 5-{[2-methacryloyloxy)ethyloxy] carbonyl}-2-oxo-tetrahydrofurane (6)

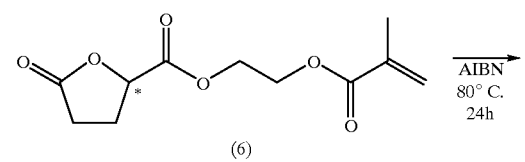

-continued

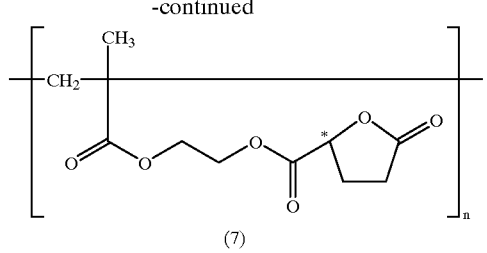

(7)

To a solution of 1.4 g (5.8 mmol) of (6) were added 50 ml toluene and 0.95 mg (0.1 mol %) AIBN. The mixture was heated to 80° C. on an oil bath for 24 h. The solvent was removed under reduced pressure, the product dissolved in 5 ml dichloromethane and precipitated in hexane. The polymer was filtered and dried in vacuo.

Yield: 1.25 g=89.3%

IR-spectrum: (ν in ppm, KBr) 2966 ($CH_3$); 1790 (C=O, lactone); 1706 (C=O); 1694 (C=O); 1145 (C—O); 1061 (C—O—C)

$^1$H-NMR-spectrum: (δ in ppm, 200 MHz, DMSO-$d_6$) 5.35 (m, 1H, $C^γH$); 3.7 (m, 4H, O—$CH_2$—$CH_2$—O); 2.6-2.36 (m, 2H, $C^αH_2$); 2.36-1.86 (m, 2H, $CH^βH$); 1.86-1.45 (m, 2H, $CH_2$); 1.2 (m, 3H, $CH_3$).

$^{13}$C-NMR-spectrum: (δ in ppm, 75.4 MHz, DMSO-$d_6$) 176.33 (C=O, lactone); 175.31 (C=O, ester); 169.7 (C=O, ester); 75.9 (CH); 62.58 (d,$CH_2$—$CH_2$—O); 44.37 ($CH_2$—C($CH_3$)); 44.05 (C($CH_3$)); 26.4 ($CH_2$); 25.15 ($CH_2$); 18.06 ($CH_3$).

c) Polymer analogous reaction of 5-{1-methyl-1-[2-(2-oxo-tetrahydrofurane-2-yl)carbonyloxy]ethyloxycarbonyl}ethylene (7) with 2,3-epoxypropylphenylether IR-spectrum (ν in $cm^{-1}$, KBr) 3031 (CH,arom.); 2944 ($CH_3$); 1779 (C=O, lactone); 1706 (C=O); 1693 (C=O); 1599 (C—C arom.); 1152 (C—O—C); 756 (CH, arom.); 692 (CH, arom.).

$^1$H-NMR-spectrum: (δ in ppm, 200 MHz, $CDCl_3$) 7.3 (m, 2H, H arom.); 6.9 (m, 3H, H arom.); 4.3-3.7 (m, 10H, $CH_2$O); 2.23-1.84 (m, 4H, $CH_2$); 1.27 (m, 2H, $CH_2$—$CCH_3$); 0.9 (m, 3H, $CH_3$).

EXAMPLE 3

Poly-{1-methyl-1-[2-(phenoxymethyl)-8,8-dimethyl-1,4,6-trioxaspiro[4.4]nonane-9-yl]oxycarbonyl]ethylene} a) Synthesis of 4,4-Dimethyl-3-methacryloyloxy-2-oxo-tetrahydrofurane (10)

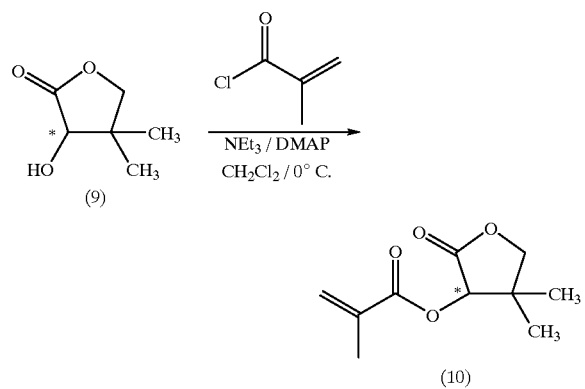

8.2 g 4,4-Dimethyl-3-hydroxy-2-oxo-tetrahydrofurane (9), 10.45 ml triethylamine ($NEt_3$),0.77 g 4-dimethylamino-pyridine (DMAP) were dissolved in 120 ml dichloromethane. At 0° C. 6.02 ml methacryloyl chloride were added dropwise and stirred for 3 h. After filtration the reaction mixture was extracted with saturated sodium hydrogen carbonate, potassium hydrogen sulfate and saturated sodium chloride, dried ($Na_2SO_4$), filtered and concentrated by solvent removal under reduced pressure. The obtained pale yellow product was purified by column chromatography on silica-gel 60 (Merck, 70–230 mesh), elution with dichloromethane/ethylacetate (9:1).

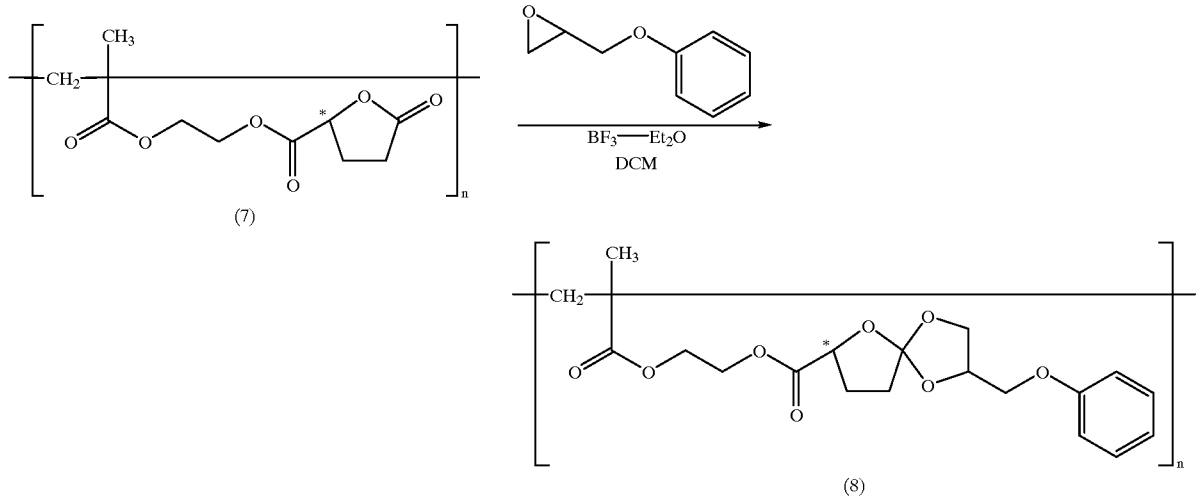

To a solution of 0.75 g (3.1 mmol) poly{1-methyl-1[2-(5-oxotetrahydrofurane-2-yl)carbonyloxy]ethyloxycarbonyl}ethylene (7) was added 60 ml dichloromethane, 1.7 ml (12.4 mmol) 2,3-epoxypropylphenylether and 0.15 ml borontrifluoride etherate. The mixture was stirred at room temperature for 4 h, the catalyst hydrolized with 5 ml of aqueous sodium hydroxide. The organic layer was separated, dried, concentrated and the polymer was precipitated by pouring the solution in ethanol.

Yield: 8.32 g, ≈66.6 %

$^1$H-NMR-spectrum (CDCl$_3$): δ=1.2 (—C(CH$_3$)$_2$-, 2s,6H); 2.0 (—CH$_3$, s, 3H); 4.1 (—CH$_2$, s, 2H); 5.45 (—CH—, s, 1H); 5.7 (=CH, m, 1H), 6.25 (=CH, m, 1H)

IR-spectrum (KBr) (ν in cm$^{-1}$); 3108 (w, s,=CH); 2970-2880 (s, aliphat, CH), 1792 (s, s, O—C=O, lactone); 1727 (s, s, C=O); 1638 (s, s, C=C); 1350-1050 (s, C—O—C).

b) Poly-[4,4-dimethyl-3-methacryloyloxy-2-oxo-tetrahydrofurane] (11)

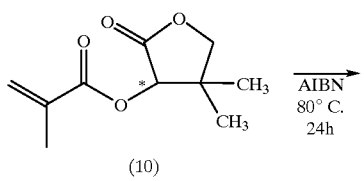

(10)

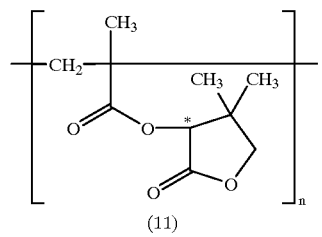

(11)

1.5 g of 4,4-dimethyl-3-methacryloyloxy-2-oxo-tetrahydrofurane (10) and 6.2 mg azoblsisobutyronitrile (AIBN) were dissolved in 75 ml THF and heated to 80° C. The polymerization was carried out for 24 h in a constant temperature bath. The polymer was precipitated in hexane.

The molecular weight of polymer (11) determined by gel-permeation chromatography was $M_W$=18000.

Yield: 1.08 g=72% polymer 0.35 g=23 % oligomers $^1$H-NMR-spectrum (CDCl$_3$): d=1.2 (m, CH$_3$, 9H); 2.11 (m, CH$_2$, 2H); 4.03 (s, CH$_2$O, 2H); 5.28 (s, OCHC=O, 1 H)

IR-spectrum (KBr), (ν in cm$^{-1}$): 2970-2880 (s, aliphat, CH); 1794 (s, s, O—C=O, lactone); 1741 (s, s, C=O); 1350-1050 (s, C—O—C).

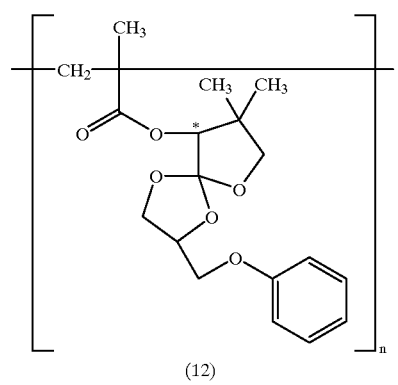

(12)

c) Polymer analogous reaction of (II) with phenoxymethyloxirane 1.5 g poly(4,4-dimethyl-3-methacryloyloxy-2-oxo-tetrahydrofurane) (11) and 4.1 ml phenoxymethyloxirane were dissolved in 60 ml dichloromethane. 0.15 ml boron trifluoride etherate were added and the reaction mixture was stirred for 3 h. The mixture was extracted with sodium hydroxide and the organic layer was dried with Na$_2$SO$_4$ and evaporated. The polymer was precipitated in hexane.

The molecular weight of polymer (12) determined by gel-permeation chromatography was $M_W$=35000.

Yield: 1.81 g $^1$H-NMR-spectrum (DMSO-d$_6$)δ: 1.2 (m, CH$_3$, 9H); 2.1 (m, CH$_2$, 2H); 3.3-5.4 (m, CH$_2$, CH, 8H); 6.9 (m, C$_6$H$_5$, 3H); 7.2 (m, C$_6$H$_5$, 2H).

IR-spectrum (KBr) (ν in cm$^{-1}$): 3060, 3039 (w, =C—H); 2967-2878 (s, aliphat, C—H); 1794 (s, s, O—C=O, lactone); 1738 (s, s, C=O): 1600 (s, s, arC—C); 1350-1050 (s, C—O—C); 756, 692 (s, s, arC—H).

$^1$H-NMR spectra were recorded on a CXP -200 FT-NMR and the IR-spectra on a FTIR 60 SRX-spectrometer.

Gel-permeation chromatography analysis were carried out using a Waters apparatus with UV-detector and a Melz apparatus to detect the refractive index.

Molecular weights were determined by gel-permeation chromatography using THF as eluent and calibration with PMMA standards.

What is claimed is:

1. A process for the manufacture of polymers having repeating units comprising spiro orthoester groups of the following general formula I

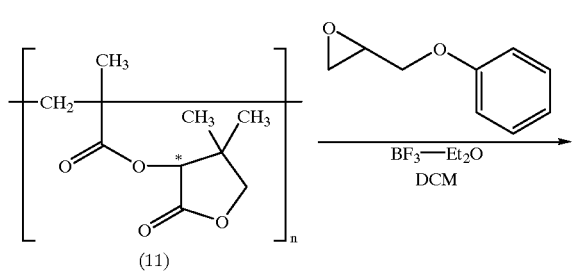
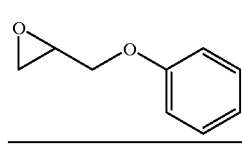
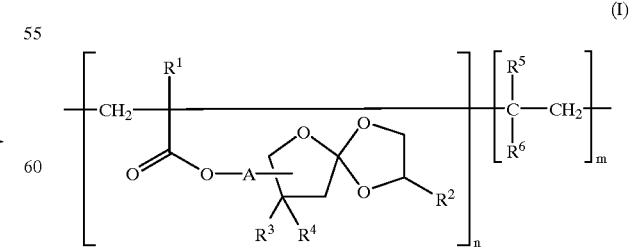

(11)                                                    (I)

wherein
- A is $C_{1-6}$-alkylene, $C_{1-6}$-alkyleneoxycarbonyl or an oxygen-carbon bond,
- $R^1$ is hydrogen or methyl,
- $R^2$ is $C_{1-6}$-alkyl or $C_{1-6}$-alkyl substituted by $C_{1-6}$-alkoxy or aryloxy,
- $R^3$ and $R^4$ independently are hydrogen or $C_{1-6}$-alkyl,
- $R^5$ is hydrogen or methyl,
- $R^6$ is hydrogen, methyl, phenyl, carboxy, carboxy-$C_{1-6}$-alkyl, carboxamido or cyano,
- n is an integer >1 and
- m is 0 or an integer >1, with the proviso that the weight average molecular weight of the polymer is between 500 and 1,000,000 as measured by gel-permeation chromatography, the process comprising reacting a polymer having repeating units comprising lactone groups of the following general formula II

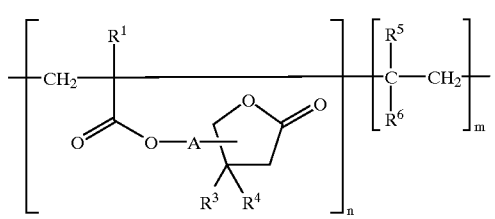
(II)

wherein A, $R^1$, $R^3$, $R^4$, $R^5$, $R^6$, n and m are as defined above, with an oxirane compound of the following general formula III

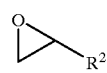
(III)

wherein $R^2$ is as defined above.

2. The process according to claim 1, wherein the reaction is carried out in a polar organic solvent and in the presence of a catalyst.

3. The process according to claim 2, wherein the reaction is carried out in a halogenated organic solvent and in the presence of a Lewis acid catalyst.

4. The process according to claim 3, wherein the reaction is carried out in dichloromethane and in the presence of borontrifluoride etherate as the catalyst.

5. The process according to claim 1, wherein the reaction is carried out at room temperature.

6. The process according to claim 1, wherein the starting compound of general formula II is manufactured by radical polymerization of a 2-oxo-tetrahydrofurane derivative of the following general formula IV

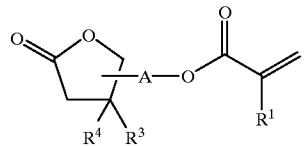
(IV)

wherein A, $R^1$, $R^3$ and $R^4$ are as defined in claim 1, optionally in the presence of a copolymerizable monomer of the general formula V

(V)

wherein R5 and $R^6$ are as defined in claim 1.

7. The process according to claim 6, wherein the polymerization is carried out in solution in an inert organic solvent and in presence of a radical forming catalyst.

8. The process according to claim 7, wherein the solvent comprises an aromatic solvent and the catalyst comprises a peroxide catalyst or azobisisobuytronitrile.

9. A polymer having repeating units comprising spiro orthoester groups of the following general formula I

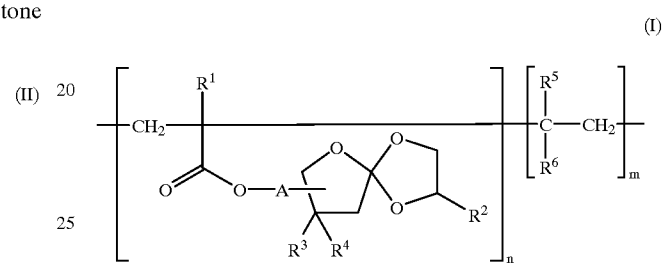
(I)

wherein
- A is $C_{1-6}$-alkylene $C_{1-6}$-alkyleneoxycarbonyl or an oxygen carbon bond,
- $R^1$ is hydrogen or methyl,
- $R^2$ is $C_{1-6}$-alkyl or $C_{1-6}$-alkyl substituted by $C_{1-6}$-alkoxy or aryloxy,
- $R^3$ and $R^4$ independently are hydrogen or $C^{1-6}$-alkyl,
- $R^5$ is hydrogen or methyl,
- $R^6$ is hydrogen, methyl, phenyl, carboxy, carboxy-$C_{1-6}$-alkyl, carboxamido or cyano,
- n is an integer >1 and
- m is 0 or an integer>1, with the proviso that the weight average molecular weight of the polymer is between 500 and 1,000,000 as measured by gel-permeation chromatography.

10. A homopolymer having repeating units comprising spiro orthoester groups of the following general formula VI

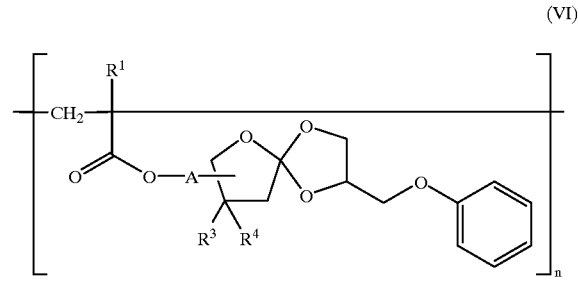
(VI)

wherein
- A is $C_{1-6}$-alkylene, $C_{1-6}$-alkyleneoxycarbonyl or an oxygen-carbon bond,
- $R^1$ is hydrogen or methyl,
- $R^2$ is $C_{1-6}$-alkyl or $C_{1-6}$-alkyl substituted by $C_{1-6}$-alkoxy or aryloxy,
- $R^3$ and $R^4$ independently are hydrogen or $C_{1-6}$-alkyl, n is an integer >1, with the proviso that the weight average molecular weight of the polymer as measured by gel-permeation chromatography is between 3,000 and 50,000.

11. Poly-(1-methyl- 1-[2-(phenoxymethyl)-1,4,6-trioxaspiro [4.4]nonane-7-yl]methoxycarbonyl) ethylene having repeating units of the formula 4

(4)

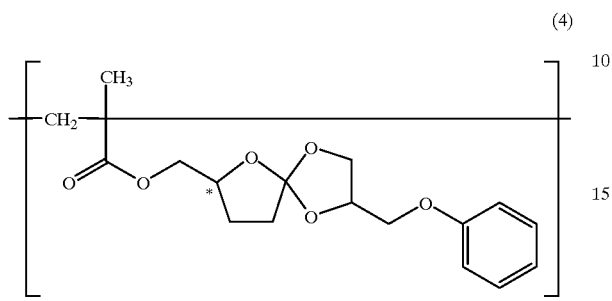

and a weight average molecular weight in the range of 5,000 to 50,000 as measured by gel-permeation chromatography.

12. Poly-(1-methyl-1-[2-(phenoxymethyl)-1,4,6-trioxaspiro[4.4]nonane-7-yl]carbonyloxy-ethoxycarbonyl) ethylene having repeating units of the formula 8

(8)

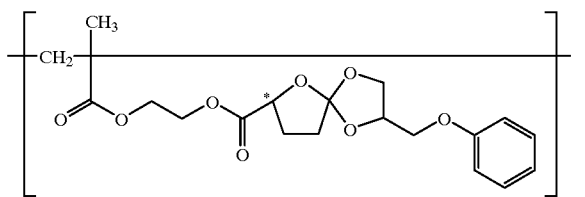

and a weight average molecular weight in the range of 5,000 to 50,000 as measured by gel-permeation chromatography.

13. Poly(1-methyl-1-[2-(phenoxymethyl)-8,8-dimethyl-1,4,6-trioxaspil-m ro [4.4]nonane-9-yl]oxycarbonyl) ethylene having repeating units of the formula 12

(12)

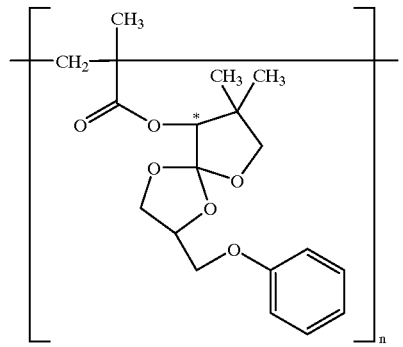

and a weight average molecular weight in the range of 5,000 to 50,000 as measured by gel-permeation chromatography.

14. The polymer according to claim 9, wherein the weight average molecular weight as measured by gel permeation chromatography is between 500 and 500,000.

15. The polymer according to claim 9, wherein the weight average molecular weight as measured by gel permeation chromatography is between 1000 and 50,000.

16. The polymer according to claim 9, wherein the weight average molecular weight as measured by gel permeation chromatography is between 25,000 and 45,000.

* * * * *

UNITED STATES PATENT AND TRADEMARK OFFICE
CERTIFICATE OF CORRECTION

PATENT NO.    : 6,258,895 B1                                             Page 1 of 1
DATED         : July 10, 2001
INVENTOR(S)   : Zamzow et al.

It is certified that error appears in the above-identified patent and that said Letters Patent is hereby corrected as shown below:

Column 8,
Line 57, "β" should read -- $^{\beta}$ --. (Superscript format)

Signed and Sealed this

Twenty-second Day of July, 2003

JAMES E. ROGAN
*Director of the United States Patent and Trademark Office*